(12) United States Patent
Becker et al.

(10) Patent No.: US 8,288,489 B2
(45) Date of Patent: *Oct. 16, 2012

(54) USE OF A HIGHLY VISCOUS LARGELY AMORPHOUS POLYOLEFIN FOR THE PRODUCTION OF A FILM

(75) Inventors: Hinnerk Gordon Becker, Essen (DE); Hans Guenther Wey, Muelheim (DE); Marion Vornholt, Herten (DE); Marlies Vey, Marl (DE); Lutz Mindach, Bochum (DE); Hans-Dieter Zagefka, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 369 days.

This patent is subject to a terminal disclaimer.

(21) Appl. No.: 11/911,394

(22) PCT Filed: Mar. 14, 2006

(86) PCT No.: PCT/EP2006/060691
§ 371 (c)(1),
(2), (4) Date: Oct. 12, 2007

(87) PCT Pub. No.: WO2006/108747
PCT Pub. Date: Oct. 19, 2006

(65) Prior Publication Data
US 2008/0214757 A1      Sep. 4, 2008

(30) Foreign Application Priority Data
Apr. 13, 2005   (DE) .......................... 10 2005 017 200

(51) Int. Cl.
*C08F 10/04*    (2006.01)
*C08L 23/00*    (2006.01)
(52) U.S. Cl. ....................... 526/137; 526/348.6; 525/240
(58) Field of Classification Search ................ 526/348.6, 526/137; 525/240
See application file for complete search history.

(56) References Cited

U.S. PATENT DOCUMENTS

| | | | |
|---|---|---|---|
| 4,309,522 A | 1/1982 | Dietrich et al. | |
| 5,989,725 A * | 11/1999 | Bullard et al. | 428/516 |
| 6,380,341 B1 | 4/2002 | Waymouth et al. | |
| 6,541,570 B2 * | 4/2003 | Beccarini et al. | 525/191 |
| 6,552,154 B1 | 4/2003 | Kohlstruk et al. | |
| 6,586,543 B1 | 7/2003 | Wey et al. | |
| 6,730,628 B2 | 5/2004 | Kohlstruk et al. | |
| 6,794,482 B2 | 9/2004 | Gloeckner et al. | |
| 6,797,787 B2 | 9/2004 | Scholz et al. | |
| 6,800,714 B2 | 10/2004 | Kohlstruk et al. | |
| 6,881,785 B2 | 4/2005 | Glockner et al. | |
| 7,005,002 B2 | 2/2006 | Gloeckner et al. | |
| 7,033,522 B2 | 4/2006 | Jonderko et al. | |
| 7,101,958 B2 | 9/2006 | Gloeckner et al. | |
| 7,135,522 B2 | 11/2006 | Gloeckner et al. | |
| 7,138,465 B2 | 11/2006 | Gloeckner et al. | |
| 7,144,975 B2 | 12/2006 | Gloeckner et al. | |
| 7,183,372 B2 | 2/2007 | Andrejewski et al. | |
| 7,199,166 B2 | 4/2007 | Gloeckner et al. | |
| 2004/0013862 A1 * | 1/2004 | Brebion et al. | 428/212 |
| 2004/0122172 A1 | 6/2004 | Glockner et al. | |
| 2005/0010016 A1 | 1/2005 | Gloeckner et al. | |
| 2005/0043501 A1 | 2/2005 | Glockner et al. | |
| 2005/0187350 A1 * | 8/2005 | Stevens et al. | 525/240 |
| 2005/0254731 A1 * | 11/2005 | Berbert et al. | 383/7 |
| 2006/0074217 A1 | 4/2006 | Gloeckner et al. | |
| 2007/0092722 A1 * | 4/2007 | Vermunicht et al. | 428/355 R |
| 2007/0123661 A1 | 5/2007 | Glockner et al. | |
| 2011/0088777 A1 | 4/2011 | Becker et al. | |

FOREIGN PATENT DOCUMENTS

EP        0335484     * 4/1989

OTHER PUBLICATIONS

U.S. Appl. No. 11/911,421, filed Oct. 12, 2007, Becker, et al.
U.S. Appl. No. 10/586,587, filed Jul. 20, 2006, Gloeckner, et al.
U.S. Appl. No. 11/587,792, filed Sep. 18, 2007, Gloeckner, et al.
U.S. Appl. No. 11/631,392, filed Dec. 29, 2006, Gloeckner, et al.
U.S. Appl. No. 11/574,197, filed Feb. 23, 2007, Gloeckner, et al.
U.S. Appl. No. 11/573,212, filed Jun. 14, 2007, Gloeckner, et al.
U.S. Appl. No. 11/632,303, filed Jan. 12, 2007, Andrejewski, et al.
U.S. Appl. No. 11/574,113, filed Feb. 22, 2007, Gloeckner, et al.
U.S. Appl. No. 11/577,955, filed Apr. 25, 2007, Gloeckner, et al.
U.S. Appl. No. 11/577,415, filed Apr. 18, 2007, Gloeckner, et al.
U.S. Appl. No. 11/814,306, filed Oct. 30, 2007, Gloeckner, et al.
U.S. Appl. No. 11/577,139, filed Apr. 12, 2007, Gloeckner, et al.
U.S. Appl. No. 11/917,104, filed Dec. 10, 2007, Vey, et al.
U.S. Appl. No. 11/909,098, filed Sep. 19, 2007, Spyrou, et al.
U.S. Appl. No. 12/158,800, filed Jun. 23, 2008, Gloeckner, et al.
U.S. Appl. No. 12/159,097, filed Jun. 25, 2008, Gloeckner, et al.

(Continued)

*Primary Examiner* — Robert D. Harlan
(74) *Attorney, Agent, or Firm* — Oblon, Spivak, McClelland, Maier & Neustadt, L.L.P.

(57) ABSTRACT

A one-layer or multilayer sheet having good layer adhesion and good transparency is produced using a polyolefin which contains the following monomer units:
a) not more than 25% by weight of units which are derived from ethene,
b) not more than 75% by weight of units which are derived from propene and
c) from 5 to 100% by weight of units which are derived from an α-olefin having 4 to 20 carbon atoms,
the polyolefin having the following parameters:
d) a weight-average molecular weight in the range of from 70 000 to 10 000 000 g/mol,
e) a polydispersity in the range of from 4 to 60,
f) a melt viscosity, measured by oscillation rheometry at a shear rate of 1 Hz at 190° C., in the range of from 100 000 to 100 000 000 mPa·s,
g) a needle penetration in the range of from 3 to 70·0.1 mm,
h) an enthalpy of fusion in the range of from 2 to 100 J/g,
i) a glass transition temperature $T_g$ in the range of from −15° C. to −80° C. and
j) a final melting point of the crystalline fraction in the range of from 85 to 175° C.

20 Claims, No Drawings

OTHER PUBLICATIONS

U.S. Appl. No. 12/159,673, filed Jun. 30, 2008, Gloeckner, et al.
U.S. Appl. No. 12/159,906, filed Jul. 2, 2008, Gloeckner, et al.
U.S. Appl. No. 12/746,091, filed Jun. 3, 2010, Becker, et al.
U.S. Appl. No. 12/863,716, filed Jul. 20, 2010, Becker, et al.
U.S. Appl. No. 12/830,628, filed Jul. 6, 2010, Becker, et al.
U.S. Appl. No. 12/830,869, filed Jul. 6, 2010, Becker, et al.
U.S. Appl. No. 12/830,889, filed Jul. 6, 2010, Becker, et al.
U.S. Appl. No. 12/990,955, filed Nov. 4, 2010, Becker, et al.
U.S. Appl. No. 13/201,522, filed Aug. 15, 2011, Kohlstruk, et al.
U.S. Appl. No. 13/144,968, filed Jul. 18, 2011, Kohlstruk, et al.

* cited by examiner

USE OF A HIGHLY VISCOUS LARGELY AMORPHOUS POLYOLEFIN FOR THE PRODUCTION OF A FILM

CROSS-REFERENCE TO RELATED APPLICATIONS

The present application is a 35 U.S.C. §371 National Stage patent application of International patent application PCT/EP06/060691, filed on Mar. 14, 2006, which claims priority to German patent application DE 102005017200.8, filed on Apr. 13, 2005.

The invention relates to the use of a high molecular weight and at the same time substantially amorphous poly-α-olefin for the production of a sheet and also to a sheet which contains at least one layer based on this poly-(x-olefin. Here and below, the term "sheet" expressly includes the term "film". The two terms are as a rule used synonymously.

JP-A-2003073511 describes unstretched, nonoriented multilayer films having a good balance of slideability, impact strength and transparency as laminated packaging sheets. For the production of these films, crystalline random copolymers of from 85 to 98.5 mol % of propene and from 15 to 1.5 mol % of an α-olefin having MFR values of from 2 to 20 g/10 min and melting points $T_m$ of from 120 to 150° C. are used. These are mixed with a polyethylene wax and optionally with a polyolefin elastomer in order to establish the desired combination of properties. However, the fact that such sheets based on propylene polymers do not adhere to polyethylene (as a substrate or sheet layer) is a disadvantage; moreover, a simplified formulation in which the desired material properties need not first be established by mixing high molecular weight and low molecular weight components would be desirable.

JP-A-2001171057 describes the production of impact-resistant, laminated packaging films resistant to low temperature for heavy goods to be packed. The three-layer films have an outer layer of a crystalline propene/α-olefin copolymer, a middle layer of a mixture of an ethene/α-olefin copolymer and an outer layer of a crystalline homopolypropylene. The ethene/α-olefin copolymer of the middle layer is required as an impact modifier. However, the use of a polyolefin as layer material which per se already has the required low-temperature impact strength would be desirable. In this way, it would be possible to save mixing and processing steps and to simplify the formulation of the sheet substantially.

JP-A-09001751 describes transparent multilayer sheets for packaging applications, which consist of at least three layers. The outer layer and the inner layer consist of the following components:

(a) a $C_2$-α-olefin($C_4$-$C_{10}$) copolymer (proportion of from 40 to 90% by weight) having an MFR of from 0.1 to 10 g/10 min, a density of from 0.880 to 0.925 g/cm³ and a polydispersity of from 2 to 3;
(b) a $C_2$-α-olefin($C_4$-$C_{10}$) copolymer (proportion of from 0 to 40% by weight) having an MFR of from 0.1 to 5 g/10 min, a density of from 0.90 to 0.925 g/cm³ and a polydispersity of from 3 to 6;
(c) a $C_2$-α-olefin($C_3$-$C_{10}$) copolymer (proportion of from 40 to 90% by weight) having an MFR of from 0.1 to 20 g/10 min and a density of from 0.850 to 0.900 g/cm³;
(d) an LDPE polymer (proportion of from 5 to 20% by weight) having a density of from 0.915 to 0.930 g/cm³.

The intermediate layer(s) consist of
(e) a $C_4$ copolymer (proportion of from 40 to 100% by weight) having an MFR of from 0.1 to 5 g/10 min and a density of from 0.890 to 0.925 g/cm³ and a $C_4$-$C_2$-$C_3$-terpolymer (proportion of from 0 to 60% by weight) having a $C_3$ content of from 50 to 98 mol % and an MFR of from 0.1 to 100 g/10 min. Moreover, a $C_4$-$C_3$-copolymer, a $C_4$-$C_2$-4-methyl-1-pentene copolymer and a $C_2$-$C_6$-copolymer are mentioned as (additional) further components.

A disadvantage here is that the desired material properties have to be established by mixing various polyolefins, which results in a greater logistics and formulation effort.

JP-A-2002294216 describes polymer compositions for use in sealing compounds and for films in the packaging sector. The polymer composition consists of a polymer blend which is composed of 3 constituents A, B and C. Component A (from 20 to 90% by weight) consists of $C_3$-polymers which have an MFR [230° C./2.16 kg] of from 0.1 to 20 g/10 min and a melting point $T_m$ of from 125 to 155° C. $C_3$-$C_4$-$C_2$-terpolymers are mentioned by way of example. The component B consists of a crystalline $C_4$-α-olefin copolymer having an MFR of from 0.1 to 25 g/10 min and a melting point $T_m$ of from 50 to 130° C. A $C_4$-$C_3$-copolymer or a $C_4$-$C_2$-copolymer having an α-olefin content of from 0.5 to 30 mol % are mentioned as examples. The component (C) consists of HDPE (from 0.5 to 15% by weight) having a density of from 0.940 to 0.980 and an MFR of from 0.01 to 20 g/10 min. A corona surface treatment of the sheet is also described.

Here too a disadvantage is that the desired material properties have to be established by mixing various polyolefins. In addition, the corona treatment is complicated and expensive.

DE-A-101 33 903 describes sheets which can be sealed at low temperature and are based on polypropylene resin, in particular for use in hygiene films. The sheets consist of a complex mixture of different copolymer components which are substantially crystalline. Here too, a disadvantage is that the desired material properties have to be established by mixing various polyolefins. In addition, the material lacks sufficient adhesive power owing to the comparatively high crystallinity.

JP-A-11058634 describes soft transparent film webs based on synthetic resins for applications in the packaging sector (in particular packaging of electrical equipment). Here, LDPE and/or iPP outer layers and an inner layer comprising a compound of amorphous poly-α-olefin (APAO) and iPP are used. The iPP-APAO compound consists of from 50 to 70% by weight of iPP and from 30 to 50% by weight of APAO. The APAO consists of from 1 to 10% by weight of $C_2$, from 5 to 30% by weight of $C_4$; the remainder is $C_3$. The products UBETAC from UbeRexene Industries, explicitly UT2780, are mentioned as examples of the APAO used. These products are amorphous and have a relatively low molecular weight. However, it would be desirable to avoid the use of mixtures of high-viscosity and low-viscosity crystalline and amorphous polymers, which use is described in JP-A-11058634, in order to save numerous mixing and processing steps and to simplify the formulation of the sheet.

The prior art sheets to date have so far been unsatisfactory. If APAOs which were polymerized on MgCl₂-supported systems are used for the sheet or film production they generally have too low a crystallinity or too pronounced a structural viscosity or a particularly disadvantageous ratio of these two material parameters. This leads firstly to high surface tack and very long "open times" and secondly to poor processability. In particular, the crystallization rate (and hence also the open time) proves to be the "crucial criterion" here since, if crystallization is too slow, the development of identity of the individual sheet layers is greatly retarded and hence expedient confectioning of the sheets is prevented. Completely amorphous polyolefins or polyolefins which have substantially no crystallinity have major disadvantages in processability. They exhibit very long open times, which leads to very long processing times. They or the sheets produced from them are unsuitable for use in high-speed processing machines. The ratio of restoring force to resilience or plasticity is as a rule poor in the case of sheets based on such amorphous polyolefins. The use of internal or external donors in the polymerization of polyolefins for sheet production leads as a rule to polymers having excessively high crystallinity which leads to too low an adhesion to the other sheet layers and hence to delamination of the multilayer sheets either during the processing itself or during use. They are unsuitable for use in high-speed processing machines. The ratio of restoring force to resilience or plasticity is as a rule poor in the case of sheets based on such purely crystalline polyolefins. If amorphous polyolefins which were polymerized with the aid of metallocene catalysts and which as a rule have low polydispersities (≦5) are used the softening point is in general very low (sometimes distinctly below 100° C.). Moreover, such polymers frequently have a waxy character so that they cannot meet the requirements set for the production of sheets using high-speed processing machines. In particular, the low softening temperature leads to problems in the cooling of the sheets, in the orientation of the sheets and in the development of identity of the individual sheet layers. They are unsuitable for use in high-speed processing machines. The ratio of restoring force to resilience or plasticity is as a rule poor in the case of sheets based on such polyolefins. At present mixtures of low-viscosity APAOs with high-viscosity, semicrystalline random propylene polymers are frequently used for modifying the properties of the sheet. However, the process to date in which mixtures of low-viscosity APAOs with high-viscosity polypropylenes are used has the following disadvantages:

1) The mixing of the two components having very different viscosities is time-consuming and energy-consumptive and therefore expensive.
2) The formulations of the sheets are complicated and expensive to produce.
3) The homogeneous mixing of low-viscosity and high-viscosity polymer melts requires a high (shear) energy input which adversely affects the stability of the viscosity and the thermal stability.
4) Low-viscosity components for the mixture do of course contain relatively large amounts of low molecular weight fractions. This limits the uses, for example in the automobile sector, due to unacceptably high fogging values.
5) Mixtures of many different constituents have disadvantageous material properties in comparison with the use of only one polymer constituent or a few polymer constituents and have poor reproducibility of the material properties.
6) Danger of "tacky haptic properties" by migration of low molecular weight, tacky fractions to the surface of the sheets.

Accordingly, it was the object to provide a suitable polyolefin for use in one-layer or multilayer sheets, which has a sufficiently high molecular weight to enable its use as material of a sheet layer, and which has good compatibility with or good layer adhesion to both polyethylene and polypropylene. The polyolefin should also be transparent at the customary sheet layer thicknesses but should nevertheless be sufficiently crystalline to have sufficient cohesion and a ratio of restoring force to resilience or plasticity which satisfies even demanding applications. There should also be sufficient crystallinity in order, if desired, to ensure a surface which is not tacky at ambient temperature and a negligible tendency to creep. Moreover, it should be readily heat-sealable.

This object was achieved by the use of a polyolefin for the production of sheets, which contains the following monomer units:

a) not more than 25% by weight, preferably from 0.1 to 20% by weight and particularly preferably from 1 to 16% by weight of units which are derived from ethene,
b) not more than 75% by weight, preferably from 0.1 to 70% by weight and particularly preferably from 4 to 65% by weight of units which are derived from propene, the upper limit of these units being 60, 55 or 50% by weight in further preferred embodiments,
c) from 5 to 100% by weight, preferably from 10 to 95% by weight and particularly preferably from 15 to 90% by weight of units which are derived from an α-olefin having 4 to 20 carbon atoms, the polyolefin having the following parameters:

d) a weight-average molecular weight in the range of from 70 000 to 10 000 000 g/mol, preferably from 85 000 to 5 000 000 g/mol and particularly preferably from 100 000 to 2 500 000 g/mol, further preferred lower limits being 120 000 g/mol or 140 000 g/mol,
e) a polydispersity in the range of from 4 to 60, preferably in the range of from 4.2 to 40, particularly preferably in the range of from 4.5 to 30, especially preferably in the range of from 4.6 to 20 and very particularly preferably in the range of from 4.8 to 15,
f) a melt viscosity, measured by oscillation rheometry at a shear rate of 1 Hz at 190° C., in the range of from 100 000 to 100 000 000 mPa·s, preferably from 200 000 to 10 000 000 mPa·s and particularly preferably from 300 000 to 5 000 000 mPa·s,
g) a needle penetration in the range of from 3 to 70·0.1 mm, preferably in the range of from 5 to 35·0.1 mm and particularly preferably in the range of from 7 to 25·0.1 mm,
h) an enthalpy of fusion in the range of from 2 to 100 J/g, preferably in the range of from 5 to 75 J/g, particularly preferably in the range of from 10 to 60 J/g and especially preferably in the range of from 12 to 50 J/g,
i) a glass transition temperature $T_g$ in the range of from −15 to −80° C., preferably in the range of from −20 to −60° C. and particularly preferably in the range of from −25 to −55° C., and
j) a final melting point of the crystalline fraction in the range of from 85 to 175° C., preferably in the range of from 90 to 173° C. and particularly preferably in the range of from 95 to 170° C.

The polyolefin preferably has an alpha value in the range of from 0.5 to 0.9, preferably in the range of from 0.6 to 0.9 and particularly preferably in the range of from 0.65 to 0.85.

The monomer units according to a), b) and c) originate from the incorporation of the corresponding olefin in the polymerization or copolymerization. The α-olefin according to c) is, for example, 1-butene, 1-pentene, 1-hexene, 1-octene, 1-decene, 1-dodecene, 1-octadecene, 3-methyl-1-butene, a methylpentene, such as, for example, 4-methyl-1-pentene, a methylhexene or a methylheptene.

The polymer composition is determined by a high-temperature $^{13}C$-NMR. The $^{13}C$-NMR spectroscopy of polymers is described, for example, in the following publications:

[1] S. Berger, S. Braun, H.-O. Kalinowski, $^{13}C$-NMR-Spektroskopie [$^{13}C$-NMR spectroscopy], Georg Thieme Verlag Stuttgart 1985
[2] A. E. Tonelli, NMR Spectroscopy and Polymer Microstructure, Verlag Chemie Weinheim 1989
[3] J. L. Koenig, Spectroscopy of Polymers, ACS Professional Reference Books, Washington 1992

[4] J. C. Randall, Polymer Sequence Determination, Academic Press, New York 1977
[5] A. Zambelli et al: Macromolecules, 8, 687 (1975)
[6] A. Filho, G. Galland: J. Appl. Polym. Sci., 80, 1880 (2001)

The properties of adhesion (for example to polymers of the polyethylene or polypropylene type), heat sealability and plasticity, the miscibility with bitumen and the ability to impart compatibility between polyethylene and polypropylene, for example in order to obtain sheet material having high transparency, can be individually established by means of the polymer composition. The co- or terpolymers according to the claim are substantially random polymers. With the use of propene as a monomer, the proportion of isotactic $C_3$-triads in a preferred embodiment is from 20 to 85%, based on the $C_3$-triads present altogether, and particularly preferably from 35 to 70%. With the use of 1-butene as a monomer, the proportion of isotactic $C_4$-triads in a preferred embodiment is from 10 to 75%, based on the $C_4$-triads present altogether, particularly preferably from 20 to 60% and especially preferably from 25 to 50%. These proportions can be determined by means of high-temperature $^{13}C$-NMR.

The molecular weight is determined by high-temperature GPC. The determination is carried out according to ASTM D6474-99, but at a higher temperature (160° C. instead of 140° C.) and with a smaller injection volume of 150 µl instead of 300 µl. The following may be mentioned as further literature on the GPC analysis of polymers:
H. G. Elias: "Makromoleküle" [Macromolecules]; Vol. 2; Wiley-VCH; Weinheim 2001;
Z. Grubisic, P. Rempp, H. Benoit; Polym. Lett.; 5; 753 (1967);
K. A. Boni, F. A. Sliemers, P. B. Stickney; J. Polym. Sci.; A2; 6; 1579 (1968);
D. Goedhart, A. Opschoor; J. Polym. Sci.; A2; 8; 1227 (1970);
A. Rudin, H. L. W. Hoegy; J. Polym. Sci.; A1; 10; 217 (1972);
G. Samay, M. Kubin, J. Podesva; Angew. Makromol. Chem.; 72; 185 (1978);
B. Ivan, Z. Laszlo-Hedvig, T. Kelen, F. Tüdos; Polym. Bull.; 8; 311 (1982);
K.-Q. Wang, S.-Y. Zhang, J. Xu, Y. Li, H. P. Li; J. Liqu. Chrom.; 5; 1899 (1982);
T. G. Scholte, H. M. Schoffeleers, A. M. G. Brands; J. Appl. Polym. Sci.; 29; 3763 (1984).

The solvent used is trichlorobenzene. The measurement is effected at a column temperature of 160° C. The universal calibration used for evaluating the elution curves is carried out on the basis of polyolefin standards. The results are not comparable with measurements whose calibrations were effected on the basis of polymers of a different type, e.g. based on polystyrene, or which are carried out without universal calibration, since otherwise an impermissible comparison of different three-dimensional polymer structures or hydrodynamic radii takes place. Furthermore, the comparison with measurements which use solvents other than the stated solvent is not permissible since different three-dimensional polymer structures or hydrodynamic radii, which lead to a different result in the molecular weight determination, may be present in different solvents.

The polydispersity $P_d$ is defined as the quotient of number average and weight average molar mass. It is in particular a measure of the width of the existing molar mass distribution, which in turn permits conclusions about the polymerization behavior present and the catalyst used. In addition, it is also a measure of the low molecular weight fraction present which in turn influences the adhesion properties of the polymer materials. It is determined by high-temperature GPC. Within certain limits, the polydispersity is characteristic of a certain catalyst-cocatalyst combination. Depending on the procedure used (e.g. 1, 2 or more stirred vessels or combinations of stirred vessel and flow tube) or method of carrying out the reaction (single or multiple metering of catalyst, cocatalyst and monomers), the molar mass distribution can be either monomodal, bimodal or multimodal. The polydispersity has a relatively strong influence on the tack of the material at room temperature and on the adhesion.

In the determination of the molar masses by means of gel permeation chromatography (GPC) the hydrodynamic radius of the polymer chains present in solution plays a particular role. In addition to thermal conductivity, RI (refractive index) or UV/VIS and FTIR or light scattering detectors, viscosity detectors are also used as detection mechanisms. If the polymer chain in solution is considered as an undisturbed coil, the relationship between its limiting viscosity number and the molar mass can be described empirically by the so-called KMHS equation $$[\eta]=K_V M_V^\alpha$$

(H.-G. Elias, Makromoleküle [Macromolecules], volume 2, 6th edition, Wiley-VCH, Weinheim 2001, pages 411-413). $K_V$ and $\alpha$ are constants which are influenced both by the constitution, configuration and molar mass of the polymer and by the solvent and the temperature. The important information of the alpha value in the present case is that of the hydrodynamic radius; this depends on the branching points present on the polymer chains. The alpha value is high in the case of less branching and low in the case of more branching.

The melt viscosity is determined according to ASTM D4440-1 by oscillation rheometry, a shear rate of 1 Hz being employed. The maximum deformation of the sample is chosen so that the sample is present in the linear viscoelastic range during the entire measuring time. Viscoelastic materials are distinguished from Hook solids by the ability to dissipate stresses resulting from deformation over a certain time (relaxation). In contrast to Newtonian liquids, which are subject to an exclusively irreversible deformation under the action of shearing or extension, viscoelastic fluids can recover a part of the deformation energy after the acting force has been removed (so-called "Memory Effect") [N. P. Cheremisinoff, "An Introduction to Polymer Rheology and Processing"; CRC Press; London; 1993]. A further characteristic of polymer melts is the occurrence of so-called structural viscosity. This is defined as behavior in which the shear stress as a resultant force degrades the initial structure of the material as a function of the shear rate. Since this degradation process requires a minimum shear rate the material flows like a Newtonian liquid below this shear rate. One explanation is given by the principle of Le Chatelier, the "deviation" of the structure of the viscous liquid (before the application of a mechanical stress) consisting in the orientation along the shear surfaces for reducing the frictional resistance. The latter leads to the degradation of the equilibrium structure of the initial state and to the establishment of a shear-oriented structure, which in turn results in easier flow (reduction in viscosity). In polymer melts, the Newtonian range is perceptible only at very low shear rates or small shear amplitudes. Its determination is possible and necessary by rheometric test methods (amplitude "sweeps", i.e. measurement at fixed frequency as a function of the shear amplitude) if the measurement is to be carried out in the reversible, i.e. reproducible range [R. S. Lenk, "Rheologie der Kunststoffe" [Rheology of plastics]; C. Hanser Verlag; Munich; 1971; J Meissner; "Rheologisches Verhalten von Kunststoff-Schmelzen und-Lösungen" [Rheological behavior of plastic melts and solutions] in. "Praktische Rheologie der Kunststoffe" [Practical rheology of plastics]; VDI-Verlag; Düsseldorf; 1978; J-F. Jansson; Proc. 8th. Int. Congr. Rheol.; 1980; Vol. 3]. Owing to its small applied force, its small deformation and the consequently small effect on the sample morphology, vibration rheometry is particularly suitable for investigating materials which exhibit strong structural viscosity behavior. The structural viscosity is more pronounced only in the range from 200 000 mPa·s. If the ratio of the melt viscosities which were determined at a shear rate of 10 Hz and a shear rate of 0.1 Hz is taken as a scale, this ratio for the polymers according to the claims is from 1:2 to 1:1000, preferably from 1:3 to 1:500 and particularly preferably from 1:5 to 1:50. The ratio of storage modulus to loss modulus can be used as a Theological characteristic of the processing window (for example on calenders or in screw machines) and of the particular ratio of molecular parameters, such as, for example, the molar mass and macroscopic material properties, such as, for example, the melt viscosity. For the claimed polymers, this ratio is from 1:1 to 1:100, preferably from 1:1.5 to 1:50 and particularly preferably from 1:2 to 1:20 at a shear rate of 1 Hz in the temperature range from the end of the melting range to 200° C.

The needle penetration is determined according to DIN EN 1426. It can also be controlled in a known manner by means of the monomer composition and the reaction conditions.

The determination of the enthalpy of fusion, of the glass transition temperature and of the melting range of the crystalline fraction is effected by means of differential calorimetry (DSC) according to DIN 53 765 from the 2nd heating curve at a heating rate of 10 K/min. The point of inflection of the heat flow curve is evaluated as the glass transition temperature. In a particular embodiment, this is in the range from −40 to −80° C. The glass transition temperature can be controlled in a known manner by means of the monomer composition and the reaction conditions. In general, the use of longer-chain monomers leads to lower glass transition temperatures. Furthermore, reaction conditions under which shorter-chain polymers also form (for example relatively high polymerization temperatures) also lead within certain limits to the reduction of the glass transition temperature. The enthalpy of fusion is a measure of the crystallinity of the polymer. The claimed polymers have relatively low crystallinity, i.e. they are substantially, but not completely, amorphous. There exists a certain crystallinity which is indispensable for the required material properties. The crystalline regions detectable on melting extend over a large temperature range from 20 to 175° C. and are more or less pronounced in terms of their intensity depending on position. The claimed polymers are distinguished in their crystallinity by the occurrence of monomodal, bimodal and multimodal melting peaks, some of which are sharply separated and some of which have a fluid transition. Polymers having bimodal and multimodal melting peaks are particularly preferred. In a possible embodiment the enthalpy of fusion (as a measure of the total crystallinity) is from 2 J/g to 10 J/g. As a result of the low crystallinity, firstly a high transparency and secondly a special combination of advantageous material properties can be achieved. Polyolefins having low crystallinity exhibit relatively high surface tack (adhesion) at room temperature, which is advantageous, for example, for intermediate layers in multilayer sheets. Moreover, they generally exhibit more flexible mechanical behavior. However, the cohesion of such materials is relatively low, and it is for this reason that these low crystallinities are not generally desired. In a further possible embodiment, the enthalpy of fusion is from 10 J/g to 30 J/g, preferably from 15 J/g to 28 J/g. As a result of the higher crystallinity, a particular combination of advantageous material properties can be achieved. Polymers according to the invention which have relatively high crystallinities, such as, for example, polybutene or butene copolymers having high proportions of butene, have, for example, very good tensile strengths. At the same time, they exhibit relatively little surface tack, which is advantageous, for example, in the case of monolayer films.

The polyolefins used according to the claims have in many cases a pronounced tendency to low-temperature crystallization, this occurring at a temperature range from −10 to 100° C. In order to accelerate the crystallization or to establish certain crystal modifications in a targeted manner, it is possible to use known nucleating agents, as used, for example, in the case of isotactic polypropylenes. These may be both inorganic and organic and may contain both low molecular weight and high molecular weight components, it being possible to use both crystalline and amorphous nucleating agents in all cases.

According to the prior art, the crystallinity can also be determined by means of the solubility in xylene. Here, a xylene isomer mixture is used, the polymer being dissolved under reflux and the solution then being cooled to room temperature. In the case of the claimed polyolefin the solubility in xylene is preferably from 80 to 99.5%, particularly preferably from 85 to 99% and especially from 90 to 98%. The determination is effected as described in the experimental section.

The highly viscous, substantially amorphous polyolefin used according to the claims is obtainable, for example, by polymerization of α-olefin monomers using a $TiCl_3 \cdot (AlCl_3)_n$ mixed catalyst (n=from 0.2 to 0.5), a trialkylaluminum compound (for example triethyl-aluminum, preferably triisopropylaluminum, particularly preferably triisobutylaluminum) being used as a cocatalyst. It is necessary to choose a particular ratio of catalyst to cocatalyst in order to obtain the described products having the described properties. The molar ratio of catalyst to cocatalyst is from 1:1 to 1:10. The activity of the catalyst used is from 5000 to 20 000 g of polymer/g of catalyst. The ethene monomer is used in gaseous form while the propene and 1-butene monomers can be used both in gaseous form and in liquid form. Higher homologs are used in liquid form. If propene and/or 1-butene are used in liquid form, a pressure corresponding to the reaction conditions which ensures a sufficient monomer concentration in the liquid phase must be maintained in the reactor used. Gaseous hydrogen is used as a molar mass regulator. The polymerization is carried out in an inert solvent which is selected, for example, from the group consisting of the aliphatic hydrocarbons. The mass ratio of polymer to solvent is from 1:100 to 1:0.01, preferably from 1:50 to 1:0.1 and particularly preferably from 1:10 to 1:0.2. In a special embodiment it is from 1:1 to 1:0.01. Polymerization in the initially introduced monomer is also possible. The polymerization is carried out either in a stirred vessel or in a stirred vessel cascade; in a particular embodiment it is also possible to use a flow tube or a tubular reactor with forced transport (e.g. a screw machine). The use of the tubular reactor with forced transport can be effected either as the only solution or in combination with stirred vessel or stirred vessel cascade. Here, both series connection and parallel connection of the individual reactors are possible. The reaction temperature is from 30 to 220° C., preferably from 70 to 150° C. and particularly preferably from 80 to 130° C. In a possible embodiment, particularly if a low polydispersity is desired, the reaction temperature is from 30 to 80° C., preferably from 40 to 60° C. and particularly preferably from 40 to 50° C. In a further possible embodiment, particularly if a high polydispersity is desired, the reaction temperature is from 80 to 200° C., preferably from 100 to 200° C. and particularly preferably from 110 to 190° C. Catalyst and cocatalyst are decomposed in a suitable manner at the end of the reaction, the decomposed catalyst constituents either remaining in the polymer or being removed via a wash step. In practice the decomposition is usually effected in a manner such that the decomposed catalyst components converted into unreactive constituents remain at least partly in the polymer. The polymer is not colored by the decomposed catalyst components converted into unreactive constituents in the preparation process according to the invention. The polymers according to the invention can be chemically stabilized according to the prior art, either in the form of their reaction solution or at a later time, in order to protect them from the harmful effect of higher temperatures, sunlight, atmospheric humidity and oxygen. For example, stabilizers which contain hindered amines (HALS stabilizers), hindered phenols, phosphites, UV absorbers, such as, for example, hydroxybenzophenones, hydroxyphenylbenzotriazoles, etc., and/or aromatic amines may be used. The effective amount of stabilizers is usually in the range of from 0.1 to 2% by weight, based on the polymer. The use of quenchers and further free radical scavengers is also possible.

After the polymerization, the polymer according to the claims is obtained either by precipitation in a precipitating agent of opposite polarity (for example an alcohol, such as, for example, methanol or butanol) or by direct devolatilization with subsequent melting process. In both cases it is possible to use both stirred vessels and stirred vessel cascades or flow tubes or tubular reactors with forced transport (for example a screw machine). In the case of the latter the use of multiscrew machines is particularly preferred, for example of those having a central spindle. The use of classical evaporation apparatuses, such as, for example, falling-film and/or thin-film evaporators, is also possible. The compounding is effected, for example, by means of granulation or pulverization. Possible methods of granulation are, for example, underwater pelletizing or granulation by underwater hot phase cutting. The use of a surfactant and/or dispersant or of a parting agent emulsion may be necessary. It is also possible to use liquefied or low-temperature gases, such as, for example, $CO_2$ and/or $N_2$, as coolants. The pulverization can be effected either by a separate milling step or by using an atomization method. In both cases, the use of supercritical fluids, such as, for example, $CO_2$, water or propane, is also possible. In this process, which is known, for example, by the name PGSS, the polymer melt is mixed with a supercritical medium and then atomized in a spray tower. The particle sizes can be controlled by the nozzle geometry and tower geometry. The milling process can also be effected with the use of low-temperature gases, such as, for example, $CO_2$ and/or $N_2$.

In order to ensure the flowability of the granules and/or of the powder, the flow auxiliaries usually used in the polymer sector may be employed. These may be either inorganic or organic and may contain both low molecular weight and high molecular weight components, it being possible to use both crystalline and amorphous flow auxiliaries in all cases. The flow auxiliaries may be either compatible or incompatible with the polyolefins according to the claims in the sense of thermodynamic miscibility. Particularly preferred flow auxiliaries are those which are compatible with the polyolefins according to the claims. Flow auxiliaries which may be used are, for example, polyolefin waxes (those based on polyethylene and those based on polypropylene) as well as Fischer-Tropsch waxes. Polyolefin waxes based on 1-butene may also be used. The use of microwaxes is also possible. In addition to waxes, olefin polymers such as, for example, polyethylene, polypropylene and/or poly(1-butene), in particular isotactic or syndiotactic polypropylene, can also be used. Both waxes and polymers can also be used in modified form (for example modified with maleic anhydride). The use of crosslinked polymers, such as, for example, crosslinked polyolefins or crosslinked styrene/divinylbenzene polymers, in the pulverized state is also possible. Suitable inorganic materials are, for example, MgO, talc, silica, etc. Moreover, the use of antistatic agents for preventing or reducing the buildup of electrostatic charge is also possible.

In a particular embodiment of the present invention no separate granulation takes place between the polymer synthesis and the sheet production. Instead, the polymerization solution obtained in the polymerization process, after introduction of additives (for example of stabilizers), is used directly or indirectly (for example after transport into suitable heated or unheated pressure-resistant containers) for production of sheets, for example cast sheets. In a further particular embodiment, the polymer melt obtained in the working-up process, after introduction of additives (e.g. of stabilizers), but without prior compounding, is used directly or indirectly (for example after transport into heated melt containers) for the production of extruded or blown films.

In the case of the claimed use of this polyolefin in sheets, either a one-layer sheet contains the polyolefin according to the claims or consists thereof or a multilayer sheet has one or more layers which contain the polyolefin according to the claims or consist thereof. In the case of such sheets, the polyolefins according to the claims can be particularly advantageously used as a modifier of an ethylene polymer, propylene polymer or poly-1-butene or as compatibilizer in blends of ethylene polymers and propylene polymers or poly-1-butene. As a result, improved mechanical properties of the blend and improved transparency are obtained. Corresponding blends which contain the following components:

I. from 0.1 to 99.9% by weight, preferably from 1 to 99% by weight, particularly preferably from 5 to 95% by weight and especially preferably from 10 to 90% by weight of the polyolefin used according to the claims and II. from 99.9 to 0.1% by weight, preferably from 99 to 1% by weight, particularly preferably from 95 to 5% by weight and especially preferably from 90 to 10% by weight of a polyolefin selected from the group consisting of ethylene polymer, isotactic propylene polymer, syndiotactic propylene polymer, isotactic poly-1-butene and syndiotactic poly-1-butene, the stated percentages being based on the sum of components I and II, can be advantageously used in the present invention. In a possible embodiment, the component according to II. is a blend of an ethylene polymer and one or more of the other polyolefins mentioned.

By the claimed use of the substantially amorphous highly viscous polyolefins, both alone and in blends with PE and PP and/or polybutene polymers, it is possible to produce sheets having particularly advantageous material properties. In particular, excellent surface properties and a particularly soft surface handle are achieved without additional treatment of the surface. Preferably, the substantially amorphous highly viscous polyolefins used are used as far as possible alone or are blended with only a few additional polymers prior to the sheet production. If blends comprising additional polymers are used preferably from 1 to 3 blend components per sheet layer are used, particularly preferably 1 or 2 blend components, very particularly preferably 1 blend component. The blend components have a melt viscosity at processing temperature which is preferably in the range of from 50 to 300% of the melt viscosity of the substantially amorphous highly viscous polyolefin used, particularly preferably in the range of from 75 to 200%, very particularly preferably in the range of from 75 to 150%. Blend components are preferably homo-, co- and/or terpolymers based on polyethylene and/or polypropylene and/or poly(1-butene). As a result of the function of the polyolefin according to the claims as a compatibilizer between crystalline and/or semicrystalline PE and/or PP blend components or polymer layers, in particular improved adhesion of the individual laminate layers to one another, as well as improved transparency of the sheets, is achieved. In addition, the adhesion to PP and/or PE polymer surfaces and other plastic surfaces (in particular S/MAA, MAA-g-PP, ABS, SAN, polystyrene, polycarbonate, (co)polyesters, (co)polyamides, polyacrylates, in particular polyalkyl methacrylates) as well as to metal and/or paper and/or textile surfaces is significantly improved without additional use of adhesive layers comprising other polymers and/or resins. A surface treatment (for example by chemical pretreatment, corona discharge, high-pressure or low-pressure plasma or the like) of individual and/or all sheet layers or of the finished sheets and/or of the surfaces to be brought into contact therewith is not necessary. Owing to the good adhesion to metals, the use described is also suitable for the production of polymer-metal laminates in the sheet sector, as used, for example, in vacuum and aroma protection packagings. Furthermore, by using the substantially amorphous highly viscous polyolefins, it is possible to produce sheets or films which have particularly good heat-seal and heat-shrinkage properties and an excellent ratio of restoring force to resilience. The latter applies in particular to the use together with PE homo- and/or copolymer layers and the use together with PP homo- and/or copolymer layers and the use together with polybutene homo- and/or copolymer layers. Depending on the composition of the substantially amorphous highly viscous polyolefin used the sheets produced also have a high heat distortion resistance. The low-temperature properties (for example on use in the chilling and/or freezing sector) of the sheets can likewise be established by means of the composition of the substantially amorphous highly viscous polyolefin polymer. Co- and terpolymers having a relatively high proportion of $C_{4-20}$-monomer units are preferably used for low-temperature applications. It is possible to produce both sheets having a high water vapor barrier effect and those having a low water vapor barrier effect (for example by perforation or the incorporation of inorganic constituents). In some cases, the use of resins, in particular hydrocarbon resins, in the production of individual layers or of the entire sheet may be expedient. In these cases, synthetic resins used are preferably those which have a softening point in the range from 60 to 180° C. In the case of unsaturated synthetic resins, the hydrogenation products are preferably used. Without being limited to these, examples of synthetic resins for the production, according to the invention, of the sheets are preferably mineral oil resins, styrene resins, terpene resins, cyclopentadiene resins and/or the co- or terpolymers thereof. The effective resin concentration is in the range from 1 to 15% by weight, preferably from 1 to 10% by weight, particularly preferably from 1 to 5% by weight, based on the respective layer. In particular cases, so-called antifogging substances may be used in one sheet layer, a plurality of sheet layers or all sheet layers. For example, fatty acid esters and/or glyceryl monooleate or glyceryl dioleate may be used. The effective concentration is as a rule from 0.1 to 2% by weight, based on the respective sheet layer. It is possible to produce both transparent and/or glossy and matt or dulled sheets, it being possible to use crystalline and/or amorphous organic and/or inorganic fillers in the crosslinked, partially crosslinked and/or uncrosslinked state. Furthermore, colored pigments may be used in any desired variation. The use in sheet applications can be effected both as a constituent of a mixture in one or more sheet layers and as sole constituent of one or more sheet layers or as the sole constituent of all sheet layers. Both one-layer and multilayer sheets can be produced, it being possible for the material of the individual layers to be either identical or different. Use as a coating of PE and/or PP polymer layers and of layers of other plastics, in particular ABS, SAN, polystyrene, polycarbonate, polyalkyl methacrylate, (co)polyesters, (co)polyamides, etc. in sheet production is also included, particularly good adhesion of the layers to one another being achieved in this case. The coating can be applied by all technically customary methods, for example by spraying (of polymer melt or polymer powder), (co)extrusion, application by means of a doctor blade, etc. The production of the films or sheets can be effected by all technically customary production processes, for example as a cast sheet, a blown film, by (co)extrusion, by calendering, etc. Both oriented (monoaxially or biaxially or multiaxially) and unoriented sheets can be produced. In the case of biaxial stretching, longitudinal stretching (in the machine direction) with subsequent transverse stretching (perpendicular to the machine direction) is preferred as a sequence of the orientation processes. If orientation is carried out it can be effected either simultaneously or stepwise (where a plurality of orientation directions is present). In the production of the sheets by an extrusion or coextrusion method, the polymer melts corresponding to the individual layers of the sheet are extruded or coextruded through a sheet die. For this purpose, the individual constituents of the respective layer are compressed in an extruder, liquefied and if desired homogeneously mixed. The extruders used for the melting or mixing process may be both single-screw extruders and twin-screw extruders (both corotating and counterrotating) or multiscrew extruders (for example having a central spindle). The screws may be equipped, for example, with a mixture of conveying, kneading and mixing elements which correspond to the material and mixing requirements. When mixing tasks have to be performed the use of shear torpedoes is explicitly included. In a particular version, the melting process is effected without the aid of screw machines in a stirred vessel; in this case, transport of the melt to the die or to the doctor blade is ensured by means of a gear pump. As a rule, the melts are simultaneously forced through a die (e.g. slot die). The one-layer or multilayer sheet forced out is cooled and solidified on a chill roll or a plurality of chill rolls, if desired also on a roll mill. The rolls are kept at temperatures of from 0 to 100° C., preferably from 10 to 80° C., particularly preferably from 10 to 30° C. If calenders are used for the production of the sheets according to the invention, it is possible to use 2-, 3-, 4- or 5-roll calenders. The roll geometry may have I-, F-, L-, Z- or S-form. If 4-roll calenders are used, the additional use of a breast roll is also possible, particularly in the case of the I-form. The sheet obtained is cooled for solidification and then optionally monoaxially, biaxially and/or multiaxially stretched and rolled up. The stretching results in orientation of the molecular chains. In the case of biaxial stretching, stretching is effected preferably in a ratio from 2:1 to 10:1 in the longitudinal direction and preferably in a ratio from 3:1 to 10:1 in the transverse direction. The longitudinal stretching is preferably carried out at a sheet temperature of from 80 to 150° C., whereas the transverse stretching is preferably carried out at a sheet temperature of from 100 to 180° C. For example, optionally cooled or heated high-speed rolls having different circumferential velocities corresponding to the desired stretching ratio can be used for carrying out the longitudinal stretching. The transverse stretching is effected, for example, with the aid of a tenter frame. All stretchings or orientations are preferably followed by heat setting of the orientation, which is carried out by heat treatment. Depending on the intended use, customary antiblocking agents and/or lubricants in the order of magnitude of from 0.1 to 2% by weight, based on the respective sheet layer, can also be used in one layer, a plurality of layers or all layers of the sheet. Suitable antiblocking agents are, for example, inorganic additives, such as silica, calcium carbonate, magnesium silicate, aluminum silicate, calcium phosphate, zinc stearate, zinc oxide, magnesium oxide, or nonionogenic surfactants, anionic surfactants and/or incompatible organic polymers, such as polyamides, polyesters and/or polycarbonates, etc. Effective lubricants, which are likewise used in a range of from 0.1 to 2% by weight (based on the respective film or sheet layer), are, for example, higher aliphatic acid amides and/or acid esters, waxes and/or metal soaps. The use of waxes, in particular of paraffin waxes, Fischer-Tropsch waxes and/or olefin waxes, is particularly preferred. The sheets produced according to the invention are particularly suitable for use on high-speed packing machines. They have good sealability (on one or both sides, depending on composition) and very good running properties.

Of course, the polyolefin according to the claims can also be used for production of blown films, it being possible to use any known technology.

The production of composite sheets is also expressly included in the invention. Composite materials used may be, for example, fibers, fleece, nonwoven or the like. These may be produced, for example, from other plastics (e.g. polyamides, polyesters, PEK, PEEK, etc.) or from inorganic materials (e.g. carbon/carbon fibers, glass/glass fibers, etc.). The production of the composite sheets can be effected both by lamination and by extrusion coating.

If the sheets are produced by coating or lacquering, it is possible to use, for example, roll coating, reverse roll coating, calendering, roll coating, application with a doctor blade, dip roll coating, etc. as a coating technique. Physically drying systems, for example those based on synthetic resins, are suitable as lacquers for the sheets.

In the production of barrier sheets, in particular with the use of metal layers, for example, metallization and ceramization may be used as production processes. In the metallization process, chemical deposition from the vapor phase, thermal deposition method and electron beam coating may be mentioned in particular.

The sheets produced according to the invention can be used, for example, in the packaging sector but are not limited thereto. Transport packaging, outer packaging and individual packaging are included. The areas of use include food packaging, packaging of electronic components and/or devices, medical packaging, packaging of toys, packaging of textiles (including protective sheets as used, for example, in cleaning), packaging of leather goods and shoes, tool packaging, wrapping of pallets, packaging of (technical) consumer goods, packaging of jewelry articles, packaging of paper goods and printed products, etc. Food packaging includes in particular packaging sheets in the household sector (e.g. so-called cling films) as well as in particular resealable food packaging as used, for example, in the packing and/or sale of fresh foods (e.g. fruit, vegetables, meat, fish, cheese, bread, bakery products, confectionery and/or finished or semifinished food preparations) (with or without heat shrinkage), and aroma protection packaging, odor barriers, etc. The packaging can be used in the normal temperature range but also in the chilling and/or freezing sector or in the area of microwave sheets (for example in the packaging of ready meals, snacks, popcorn or the like). In particular packagings of fresh meat, frozen meat, fresh fish, frozen fish, fresh vegetables, frozen vegetables, fresh fruit, frozen fruit and fresh or frozen bakery products are included. Both packaging for human food and packaging for animal feed (for example dog or cat food, bones for biting or the like) are included. The packaging produced according to the invention also covers the area of vacuum and (inert) gas packaging, metal-coated or laminated sheets also being included. In the case of (inert) gas packaging, in particular packaging with the use of oxygen, carbon dioxide, carbon monoxide, nitrogen, ethane, acetylene, argon, helium or other noble gases is explicitly included, which packaging requires a particular barrier function of the sheet used. The use of other inert gases is also possible. In the case of vacuum packaging, in particular aroma protection packaging as used for coffee and tea is included. Also included are composite packaging comprising paper or board and the sheets produced according to the invention, in which the sheets are laminated with the paper or board substrate. Examples of these are, for example, packaging for frozen bakery products or unchilled bakery products, but also packaging for detergents, etc. For example sheets which are used for protecting CD or DVD covers are also included as outer packaging of technical consumer goods. Packaging for toys and the outer packaging for boxes for toy sets are also included. Further applications are embossed and decorative films, sausage casings and peelable casings.

Protective sheets form a further area of use for the sheets produced according to the invention. These protective sheets may be used both for technical consumer goods, for example in the automotive sector for protecting paint coats, plastic surfaces or glass surfaces and for architectural elements (for example windows and window frames) or in the furniture industry (for example in the case of coated surfaces, in the case of glass elements, etc.) and in the case of electrical equipment (for example for screens, televisions, monitors, video devices, stereo devices or audio devices, game consoles, etc.) and in the telecommunications sector (for example for protecting cell phone displays or the displays of so-called PDAs) and as protective sheets for the surfaces of suitcases (for example hard suitcases of plastic and/or aluminum). They can as a rule be peeled off again. Cover sheets, as used, for example, in the agricultural sector (for example for covering so-called "pits", for protecting agricultural products, such as, for example, hay or cereal from weather effects or for improved heat input, for example in asparagus, lettuce and strawberry cultivation) are also included, as are sheets which are used for greenhouses, sheeting tunnels and/or seed beds.

The sheets according to the invention or the sheet layers which contain the polyolefin used according to the claims preferably have a minimum thickness of 0.01 mm, 0.02 mm, 0.05 mm, 0.1 mm, 0.15 mm or 0.2 mm and preferably a maximum thickness of 5 mm, 4 mm, 3 mm, 2.5 mm, 2 mm, 1.5 mm, 1.2 mm, 1 mm, 0.9 mm, 0.8 mm, 0.7 mm, 0.6 mm or 0.5 mm. If required by certain applications, however, the thickness may also be below or above this.

The invention is explained by way of example below.

EXAMPLES 1 TO 8

Preparation of Suitable Polyolefins

The monomers stated in table 1, in n-butane, were polymerized with the use of a mixed catalyst comprising a crystalline titanium trichloride in the form of a $TiCl_4$ reduced with aluminum ($TiCl_3 \cdot 0.33\ AlCl_3$) and triisobutylaluminum (in the weight ratio 1:4), at the temperature stated in table 1, in a laboratory autoclave, hydrogen optionally being used as molar mass regulator. Pressures of from 22 to 25 bar occurred. The monomers ethene and propene were metered in continuously during the reaction time of 3 h; the monomer 1-butene and optionally used higher olefins were initially introduced. After 3 h, isopropanol was added to the reaction mixture, with the result that the reaction was stopped. Unconverted monomers and the solvent n-butane were evaporated in an evaporator. The polyolefin melt was discharged at a temperature of about 190° C.

The analysis of the products obtained gave values which are listed in table 1.

Measuring Method 1 for Determining the Solubility in Xylene:

2 g of polyolefin are dissolved in 250 ml of xylene with stirring and heating to the boiling point of xylene. After refluxing for 20 min, the polymer solution is allowed to cool to 25° C. Undissolved or precipitated polyolefin is filtered off with suction (15 cm suction filter, Sartorius 390 filter paper) and dried. The remaining polymer solution is precipitated in a 5-fold excess of methanol (to which one drop of 37 percent strength aqueous HCl is added). The resulting precipitate is filtered off with suction and dried at 80° C. in a drying oven (vacuum).

Measuring Method 2 for Determining $M_w$, the Polydispersity and the Alpha Value:

The samples to be measured are weighed into 4 ml vials, and 3 ml of freshly distilled 1,2,4-trichlorobenzene stabilized with 0.5 g of butylhydroxytoluene/liter are added and said samples are dissolved for 20 minutes with gentle stirring at 165° C. The samples are measured at 160° C. on a Waters 150 C high-temperature GPC. The flow rate is 1.1 ml/min; a combination of three SDV columns (10e6A, 10e5A and 10e3A plus precolumn, 10 µm) from Polymer Standards Service GmbH, D-55120 Mainz is used. An integrated refraction index detector from Waters and the viscosity detector H502B from Viskotek serve as detectors. A universal calibration with polyolefins is carried out (calibration curve of polystyrene, polyisobutene and polyethylene from Polymer Standards Service GmbH). Weighing in and measuring of all samples are carried out in duplicate. The evaluation is effected using the software package Win_gpc6.

TABLE 1

Examples 1 to 8, preparation and properties

| Example | Monomer units | $^{13}$C-NMR Content [% by wt.] | Reaction temperature [° C.] | Amount of $H_2$ [liters (S.T.P.)] | Needle penetration [0.1 mm] | DSC $T_g$ [° C.] | Enthalpy of fusion [J/g] | Final melting point [° C.] | GPC $M_w$ (g/mol) | Poly-dispersity | Alpha | 0 at 190° C. [mPa·s] | Solubility in xylene |
|---|---|---|---|---|---|---|---|---|---|---|---|---|---|
| 1 | Ethene | 10 | 85 | 1 | 22 | −34 | 2.3 | 112 | 133 000 | 5.3 | 0.71 | 221 000 | 99.3 |
|  | Propene | 61 |  |  |  |  |  |  |  |  |  |  |  |
|  | 1-Butene | 29 |  |  |  |  |  |  |  |  |  |  |  |
| 2 | Ethene | 14 | 86 | 0.75 | 21 | −35 | 2.1 | 114 | 170 000 | 6.1 | 0.69 | 355 000 | 99.1 |
|  | Propene | 57 |  |  |  |  |  |  |  |  |  |  |  |
|  | 1-Butene | 29 |  |  |  |  |  |  |  |  |  |  |  |
| 3 | Ethene | 13 | 86 | 0.5 | 16 | −31 | 7.1 | 115 | 203 000 | 7.4 | 0.77 | 529 000 | 99.5 |
|  | Propene | 70 |  |  |  |  |  |  |  |  |  |  |  |
|  | 1-Butene | 17 |  |  |  |  |  |  |  |  |  |  |  |
| 4 | 1-Butene | 100 | 96 | 0.25 | 12 | −29 | 12 | 110 | 95 200 | 7.3 | 0.69 | 910 000 | 98.9 |
| 5 | Ethene | 7.2 | 96 | 0.25 | 15 | −34 | 5.5 | 99 | 96 200 | 6.4 | 0.74 | 730 000 | 99.3 |
|  | 1-Butene | 92.8 |  |  |  |  |  |  |  |  |  |  |  |
| 6 | Propene | 59 | 90 | 0.125 | 16 | −20 | 9.0 | 116 | 195 000 | 8.6 | 0.68 | 2 400 000 | 94.5 |
|  | 1-Butene | 41 |  |  |  |  |  |  |  |  |  |  |  |
| 7 | 1-Butene | 100 | 96 | 0.125 | 15 | −30 | 9.7 | 110 | 178 000 | 5.9 | 0.71 | 2 500 000 | 98.8 |
| 8 | Ethene | 9 | 105 | 0 | 38 | −38 | 3.2 | 125 | 337 000 | 22 | 0.63 | 920 000 | 90.2 |
|  | Propene | 46 |  |  |  |  |  |  |  |  |  |  |  |
|  | 1-Octene | 45 |  |  |  |  |  |  |  |  |  |  |  |

Preparation of the Mixtures:

For the production of the sheets melt mixtures were produced on a ZSK 25 twin-screw extruder (from Werner & Pfleiderer) at 200° C. and were extruded and granulated.

In addition to the products of examples 1 and 2, the following polymers were used as blend components:

Sabic PP 520 P, an isotactic polypropylene

Sabic LDPE 2101, a low-density polyethylene (LDPE)

Sabic LLDPE 3188, a linear low-density polyethylene (LLDPE)

The granules were used for the production of blown films and flat sheets.

EXAMPLE 9

One-Layer Blown Films Having a Thickness of 0.058 mm

Details and results in comparison with isotactic polypropylene are shown in table 2.

It is evident that, with the use of the blend, both the tensile strength and the elongation at break of the sheet are improved.

TABLE 2

Example 9; composition of the blown film layer and results (measured in the longitudinal direction)

| PO according to the invention From example 2 | Blend component [% by wt.] Sabic PP 520 P | Modulus of elasticity [MPa] DIN ISO 527/V | Tensile strength [MPa] DIN ISO 527/V | Elongation at break [%] DIN ISO 527/V |
|---|---|---|---|---|
| 0 | 100 | 544 | 38 | 607 |
| 10 | 90 | 532 | 41 | 690 |

EXAMPLE 10

Coextruded Three-Layer Blown Films Having a Thickness of 0.049 mm

Details and results in comparison with a three-layer sheet having outer layers of pure LDPE are shown in table 3.

TABLE 3

Example 10; composition of the blown film layers (% by weight) and results (measured in the longitudinal direction)

| Layer 1 | | Layer 2 | Layer 3 | | Modulus of elasticity [MPa] DIN ISO 527/V | Tensile strength [MPa] DIN ISO 527/V | Elongation at break [%] DIN ISO 527/V |
|---|---|---|---|---|---|---|---|
| Product from example 2 | Sabic LDPE 2101 | Sabic PP 520 | Product from example 2 | Sabic LDPE 2101 | | | |
| 0 | 100 | 100 | 0 | 100 | 197 | 27 | 438 |
| 10 | 90 | 100 | 10 | 90 | 214 | 27 | 530 |

It is evident that, with constant tensile strength, both the modulus of elasticity and the elongation at break are improved. Both may be considered as evidence of substantially improved adhesion of the three film layers to one another.

EXAMPLE 11

Coextruded Three-Layer Flat Sheets

Details and results in comparison with a three-layer sheet without the use of a polyolefin according to the invention are shown in table 4.

TABLE 4

Example 11; composition of the flat sheet layers (% by weight) and results (measured in the longitudinal direction)

| Layer 1 | | Layer 2 | | Layer 3 | | Modulus of elasticity [MPa] DIN ISO 527/V | Tensile strength [MPa] DIN ISO 527/V | Elongation at break [%] DIN ISO 527/V |
|---|---|---|---|---|---|---|---|---|
| Product from example 1 | Sabic LLDPE 3188 | Product from example 1 | Sabic PP 520 P | Product from example 1 | Sabic LLDPE 3188 | | | |
| 0 | 100 | 0 | 100 | 0 | 100 | 163 | 29 | 618 |
| 0 | 100 | 10 | 90 | 0 | 100 | 179 | 28 | 629 |
| 10 | 90 | 0 | 100 | 10 | 90 | 264 | 29 | 570 |

Here too, it is evident that, with constant tensile strength, both the modulus of elasticity and the elongation at break are improved. Both may be considered as evidence of substantially improved adhesion of the three sheet layers to one another.

The invention claimed is:

1. A sheet comprising a polyolefin comprising the following monomer units:

a) not more than 25% by weight of units which are derived from ethene, b) not more than 75% by weight of units which are derived from propene, and c) from 5 to 100% by weight of units which are derived from an α-olefin having 4 to 20 carbon atoms, the polyolefin having the following parameters:

d) a weight-average molecular weight in the range of from 70 000 to 10 000 000 g/mol, e) a polydispersity in the range of from 4 to 60, f) a melt viscosity, measured by oscillation rheometry at a shear rate of 1 Hz at 190° C., in the range of from 100 000 to 100 000 000 mPa·s, g) a needle penetration in the range of from 3 to 70·0.1 mm,
h) an enthalpy of fusion in the range of from 2 to 100 J/g,
i) a glass transition temperature $T_g$ in the range of from −15° C. to −80° C., and
j) a final melting point of a crystalline fraction in the range of from 85 to 175° C.

2. The sheet according to claim 1, wherein the weight-average molecular weight of the polyolefin is from 100 000 g/mol to 10 000 000 g/mol.

3. The sheet according to claim 1, wherein the polyolefin is produced by a process comprising polymerizing α-olefin monomers in the presence of a $TiCl_3 \cdot (AlCl_3)_n$ mixed catalyst, n being from 0.2 to 0.5, and a trialkylaluminum compound as a cocatalyst, with a molar ratio of mixed catalyst to cocatalyst being from 1:1 to 1:10.

4. The sheet according to claim 1, wherein the polyolefin has an alpha value in the range of from 0.5 to 0.9.

5. The sheet according to claim 1, wherein the polyolefin is the only polymer present within the sheet.

6. The sheet according to claim 1, wherein the sheet consists of a blend of the following components:
I. from 0.1 to 99.9% by weight of the polyolefin, and
II. from 99.9 to 0.1% by weight of a polyolefin selected from the group consisting of ethylene polymer, isotactic propylene polymer, syndiotactic propylene polymer, isotactic poly-1-butene and syndiotactic poly-1-butene, the stated percentages being based on the sum of components I and II.

7. A multi-layer sheet comprising in at least one layer the polyolefin according to claim 1.

8. The multi-layer sheet according to claim 7, wherein the polyolefin is the only polymer present within the at least one layer of the multi-layer sheet.

9. The multi-layer sheet according to claim 7, wherein the at least one layer of the multi-layer sheet consists of a blend of the following components:
I. from 0.1 to 99.9% by weight of the polyolefin, and
II. from 99.9 to 0.1% by weight of a polyolefin selected from the group consisting of ethylene polymer, isotactic propylene polymer, syndiotactic propylene polymer, isotactic poly-1-butene and syndiotactic poly-1-butene, the stated percentages being based on the sum of components I and II.

10. The sheet according to claim 1, wherein the polyolefin comprises
a) 0.1 to 20% by weight of units which are derived from ethene,
b) 0.1 to 70% by weight of units which are derived from propene, and
c) 10 to 95% by weight of units which are derived from the α-olefin.

11. The sheet according to claim 1, wherein the polyolefin comprises
a) 1 to 16% by weight of units which are derived from ethene,
b) 4 to 65% by weight of units which are derived from propene, and
c) 15 to 90% by weight of units which are derived from the α-olefin.

12. The sheet according to claim 1, wherein the polydispersity of the polyolefin is from 4.2 to 40.

13. The sheet according to claim 12, wherein the polydispersity is from 4.8 to 15.

14. The sheet according to claim 1, wherein the enthalpy of fusion of the polyolefin is from 2 to 10 J/g.

15. The sheet according to claim 1, wherein the enthalpy of fusion of the polyolefin is from 10 to 38 J/g.

16. A method comprising packaging a food with the sheet according to claim 1.

17. A method comprising protecting a product in need of protecting with the sheet according to claim 1.

18. A method comprising packaging a food with the multi-sheet according to claim 7.

19. A method comprising protecting a product in need of protecting with the multi-sheet according to claim 7.

20. The sheet according to claim 1, wherein the α-olefin is 1-butene, and the polyolefin has a proportion of isotactic $C_4$-triads of from 10 to 75%, based on the $C_4$-triads present altogether.

* * * * *